United States Patent
Livshitz et al.

(10) Patent No.: US 8,873,188 B2
(45) Date of Patent: Oct. 28, 2014

(54) STORAGE DEVICE HAVING DEGAUSS CIRCUITRY CONFIGURED FOR GENERATING DEGAUSS SIGNAL WITH ASYMMETRIC DECAY ENVELOPES

(71) Applicant: LSI Corporation, San Jose, CA (US)

(72) Inventors: Boris Livshitz, Eagan, MN (US); Paul Mazur, Cottage Grove, MN (US); Anamul Hoque, Lakeville, MN (US); Jason S. Goldberg, Saint Paul, MN (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/873,355

(22) Filed: Apr. 30, 2013

(65) Prior Publication Data

US 2014/0240864 A1    Aug. 28, 2014

Related U.S. Application Data

(60) Provisional application No. 61/770,688, filed on Feb. 28, 2013.

(51) Int. Cl.
  *G11B 5/03* (2006.01)
  *G11B 5/09* (2006.01)
  *G11B 20/10* (2006.01)

(52) U.S. Cl.
  CPC ............ *G11B 5/09* (2013.01); *G11B 20/10481* (2013.01)
  USPC .................... 360/66; 360/46; 360/67; 360/68

(58) Field of Classification Search
  None
  See application file for complete search history.

(56) References Cited

U.S. PATENT DOCUMENTS

| | | | |
|---|---|---|---|
| 4,607,310 A | 8/1986 | Channel et al. | |
| 4,821,127 A * | 4/1989 | Soga et al. | 360/66 |
| 4,970,621 A * | 11/1990 | Gailbreath et al. | 361/149 |
| 5,307,214 A * | 4/1994 | Kawakami et al. | 360/61 |
| 7,088,537 B2 * | 8/2006 | Cronch et al. | 360/66 |
| 7,372,653 B2 * | 5/2008 | Suzuki et al. | 360/66 |
| 7,411,756 B2 * | 8/2008 | Wilson et al. | 360/66 |
| 7,460,324 B2 | 12/2008 | Ohinata et al. | |
| 7,813,068 B2 * | 10/2010 | Takeuchi | 360/46 |
| 7,839,589 B2 * | 11/2010 | Barnett et al. | 360/46 |
| 8,503,127 B2 * | 8/2013 | Dina et al. | 360/66 |
| 8,537,487 B2 * | 9/2013 | Goldberg et al. | 360/66 |
| 8,564,471 B1 * | 10/2013 | Gao et al. | 341/166 |
| 8,699,161 B2 * | 4/2014 | Livshitz et al. | 360/46 |
| 2005/0190476 A1 * | 9/2005 | Wilson et al. | 360/46 |

(Continued)

OTHER PUBLICATIONS

M.S. Patwari et al., "Simulation of Erase After Write on 2.4T FeCo Solid Pole Writer," IEEE Transactions on Magnetics, May 2010, pp. 1212-1219, vol. 46, No. 5.

(Continued)

*Primary Examiner* — Dismery Mercedes
(74) *Attorney, Agent, or Firm* — Hamilton DeSanctis & Cha (57) ABSTRACT

A hard disk drive or other storage device comprises a storage medium, a write head configured to write data to the storage medium, and control circuitry coupled to the write head. The control circuitry comprises degauss circuitry coupled to or otherwise associated with one or more write drivers. The degauss circuitry is configured to generate an asymmetric degauss signal to be applied to the write head. The asymmetric degauss signal has a waveform with upper and lower decay envelopes that are asymmetric about a specified degauss current level, such as a substantially zero current level.

20 Claims, 7 Drawing Sheets

(56) References Cited

U.S. PATENT DOCUMENTS

| | | | |
|---|---|---|---|
| 2005/0243457 A1* | 11/2005 | Akamatsu et al. | 360/55 |
| 2006/0139787 A1* | 6/2006 | Ohinata et al. | 360/46 |
| 2006/0158764 A1 | 7/2006 | Suzuki et al. | |
| 2006/0176597 A1* | 8/2006 | Ngo et al. | 360/46 |
| 2007/0153410 A1 | 7/2007 | Hashizume et al. | |
| 2009/0284860 A1 | 11/2009 | Takeuchi | |
| 2012/0105992 A1 | 5/2012 | Dina et al. | |
| 2013/0301156 A1* | 11/2013 | Dakroub et al. | 360/46 |

OTHER PUBLICATIONS

M.E. Schabes et al., "Dynamic Micromagnetic Studies of Anisotropy Effects in Perpendicular Write Heads," IEEE Transactions on Magnetics, Oct. 2005, pp. 3073-3075, vol. 41, No. 10.

D.Z. Bai et al., "Degaussing PMR Writer Poles: A Micromagnetic Modeling Study," IEEE Transactions on Magnetics, Oct. 2011, pp. 3407-3410, vol. 47, No. 10.

J.J. Kim et al., "Magnetic Domain Observation in Writer Pole Tip for Perpendicular Recording Head by Electron Holography," Applied Physics Letters, Magnetism and Superconductivity, Apr. 2008, 3 pages, vol. 92, No, 16.

B. Livshitz et al., "Degaussing of Write Heads in Perpendicular Magnetic Recording," IEEE Transactions on Magnetics, Oct. 2011, pp. 3403-3406, vol. 47, No. 10.

H.J. Richter et al., "Unlocking of Remanent Magnetization of Pole Heads by "Rumble Strips"," IEEE Transactions on Magnetics, Oct. 2005, pp. 3061-3063, vol. 41, No. 10.

H.J. Richter et al., "Unlocking of Remanent Magnetization of Pole Heads by Medium Stray Fields," Applied Physics Letter, 2005, pp. 152508, vol. 86.

M.A. Escobar, "Advanced Micromagnetic Analysis of Write Head Dynamics Using Fastmag," IEEE Transactions on Magnetics, May 2012, pp. 1731-1737, vol. 48, No. 5.

* cited by examiner

STORAGE DEVICE HAVING DEGAUSS CIRCUITRY CONFIGURED FOR GENERATING DEGAUSS SIGNAL WITH ASYMMETRIC DECAY ENVELOPES

FIELD

The field relates generally to storage devices, and more particularly to generation of degauss signals in storage devices.

BACKGROUND

Disk-based storage devices such as hard disk drives (HDDs) are commonly used to provide non-volatile data storage in a wide variety of different types of data processing systems. In a typical HDD, data is recorded on tracks of a magnetic storage disk using a write signal comprising multiple write pulses. The write signal is generated by a write driver that is coupled to a write head of the HDD via a transmission line. In order to record a given data bit, the write driver generates a write pulse that transitions from a negative write current to a positive write current, or vice-versa.

At the completion of a given write operation, the write head may exhibit remanent magnetization after the write current has been turned off. This residual magnetization or "domain lock up" can be the cause of a phenomenon known as erase after write (EAW), where a non-energized (i.e., zero write current) head is seen to erase or degrade previously-written tracks of the disk. These previously-written tracks may comprise user data or even fixed servo sectors that are used to control the tracking of the radial position of the write head. In order to address the EAW problem, a degauss signal may be applied to the write head immediately after completion of the write operation.

The typical degauss signal waveform includes current pulses that repeat at a fixed frequency and decay in amplitude over time, usually from a write mode current level to a zero current level or other small final value. The degauss signal waveform is therefore typically an alternating current waveform, with pulse amplitudes decaying at a specified rate. The waveform may include overshoot on each pulse.

SUMMARY

In one embodiment, an HDD or other storage device comprises a storage medium, a write head configured to write data to the storage medium, and control circuitry coupled to the write head. The control circuitry comprises degauss circuitry coupled to or otherwise associated with one or more write drivers. The degauss circuitry is configured to generate an asymmetric degauss signal to be applied to the write head. The asymmetric degauss signal has a waveform with upper and lower envelopes that are asymmetric about a specified degauss current level, such as a substantially zero current level, or a positive or negative current level. Other asymmetric degauss signal waveforms can be used to effectively reduce remanent magnetization of the write head in other embodiments.

By way of example only, the degauss circuitry may comprise a first signal generator configured to generate a symmetric degauss signal having a waveform with upper and lower decay envelopes that are symmetric about the specified degauss current level, a second signal generator configured to generate a bias signal, and a signal combiner having first and second inputs coupled to respective outputs of the first and second signal generators and configured to combine the symmetric degauss signal and the bias signal to form the asymmetric degauss signal.

As another example without limitation, the degauss circuitry may comprise a first controller configured for controlling the upper decay envelope of the asymmetric degauss signal waveform responsive to a first control signal, and a second controller configured for controlling the lower decay envelope of the asymmetric degauss signal waveform responsive to a second control signal.

Numerous other arrangements of degauss circuitry may be used in other embodiments of the invention.

Other embodiments of the invention include but are not limited to methods, apparatus, systems, processing devices, integrated circuits and computer-readable storage media having computer program code embodied therein.

BRIEF DESCRIPTION OF THE DRAWINGS

FIGS. 5A through 5F are collectively referred to herein as FIG. 5.

DETAILED DESCRIPTION

Embodiments of the invention will be illustrated herein in conjunction with exemplary disk-based storage devices, write drivers and associated degauss circuitry for generating an asymmetric degauss signal having a waveform with upper and lower decay envelopes that are asymmetric about a specified degauss current level. It should be understood, however, that these and other embodiments of the invention are more generally applicable to any storage device in which improved head demagnetization and operating performance are desired. Additional embodiments may be implemented using components other than those specifically shown and described in conjunction with the illustrative embodiments.

Figure 1:
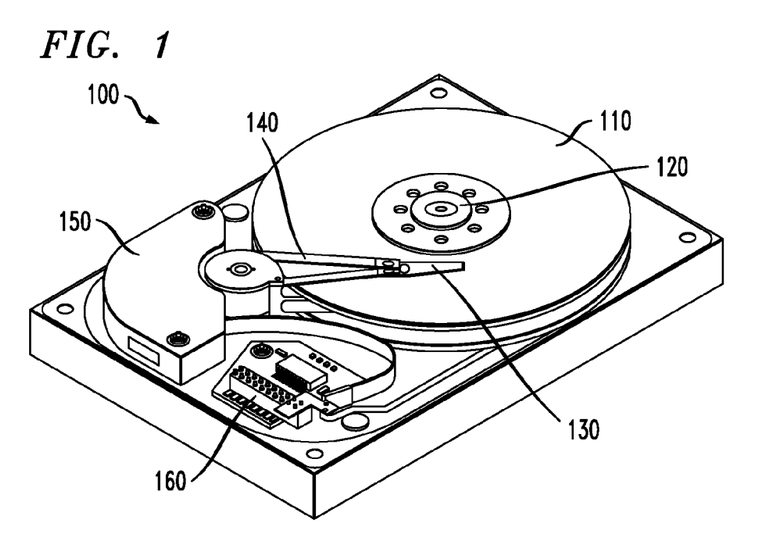
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. It is to be appreciated that the head 130 is shown only generally in FIG. 1. The position of the read/write head 130 over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1. Examples of such additional components will be shown in other figures, such as FIGS. 3, 4 and 6.

The term "control circuitry" as used herein is therefore intended to be broadly construed so as to encompass, by way of example and without limitation, drive electronics, signal processing electronics, and associated processing and memory circuitry, and may encompass additional or alternative elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators. Also, both sides of storage disk 110 and any other storage disks in a particular embodiment may be used to store data and accordingly may be subject to read and write operations, through appropriate configuration of one or more read/write heads.

A given read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. A given read/write head such as read/write head 130 may therefore include both a read head and a write head. Such heads may comprise, for example, write heads with wrap-around or side-shielded main poles, or any other types of heads suitable for recording and/or reading data on a storage disk. Read/write head 130 when performing write operations may be referred to herein as simply a write head.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
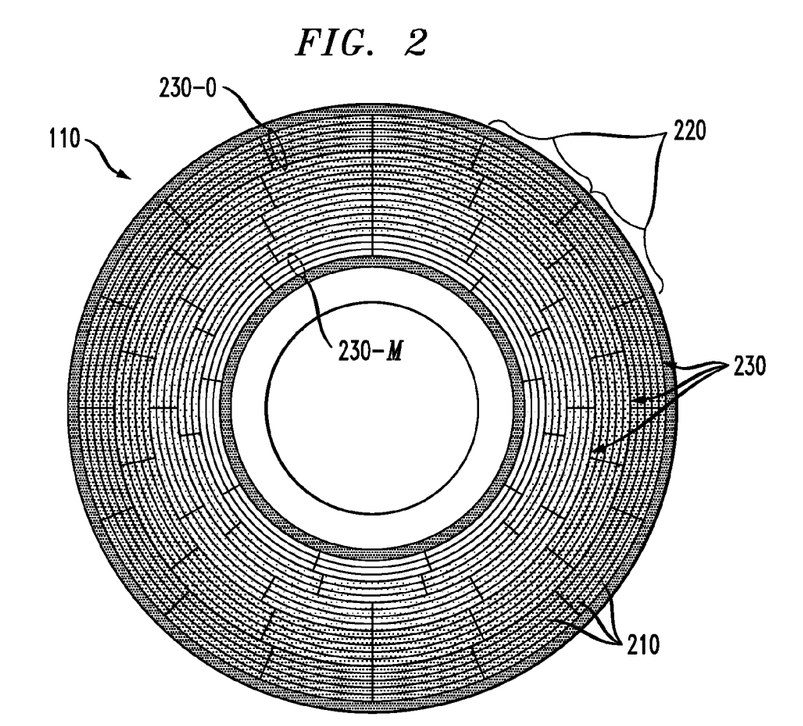
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Areal and linear bit densities are generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two. As one example embodiment, provided by way of illustration only, the outermost annular zone may have a data transfer rate of approximately 2.3 Gb/s, while the innermost annular zone has a data transfer rate of approximately 1.0 Gb/s. In such an implementation, the HDD may more particularly have a total storage capacity of 500 Gigabytes (GB) and a spindle speed of 7200 revolutions per minute (RPM), with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner.

The particular data transfer rates and other features referred to in the embodiment described above are presented for purposes of illustration only, and should not be construed as limiting in any way. A wide variety of other data transfer rates and storage disk configurations may be used in other embodiments.

Embodiments of the invention will be described below in conjunction with FIGS. 3 to 9, in which the storage device 100 of FIG. 1 is configured to implement at least one write driver and associated degauss circuitry configured to generate an asymmetric degauss signal having upper and lower decay envelopes that are asymmetric about a specified degauss current level, such as a substantially zero current level, or a positive or negative current level. By way of example, the storage device 100 may be configured to operate in different modes of operation, including modes with and without asymmetric degauss signal generation. Examples of degauss signals with and without asymmetric waveforms will be described in greater detail below in conjunction with FIG. 5.

Figure 3:
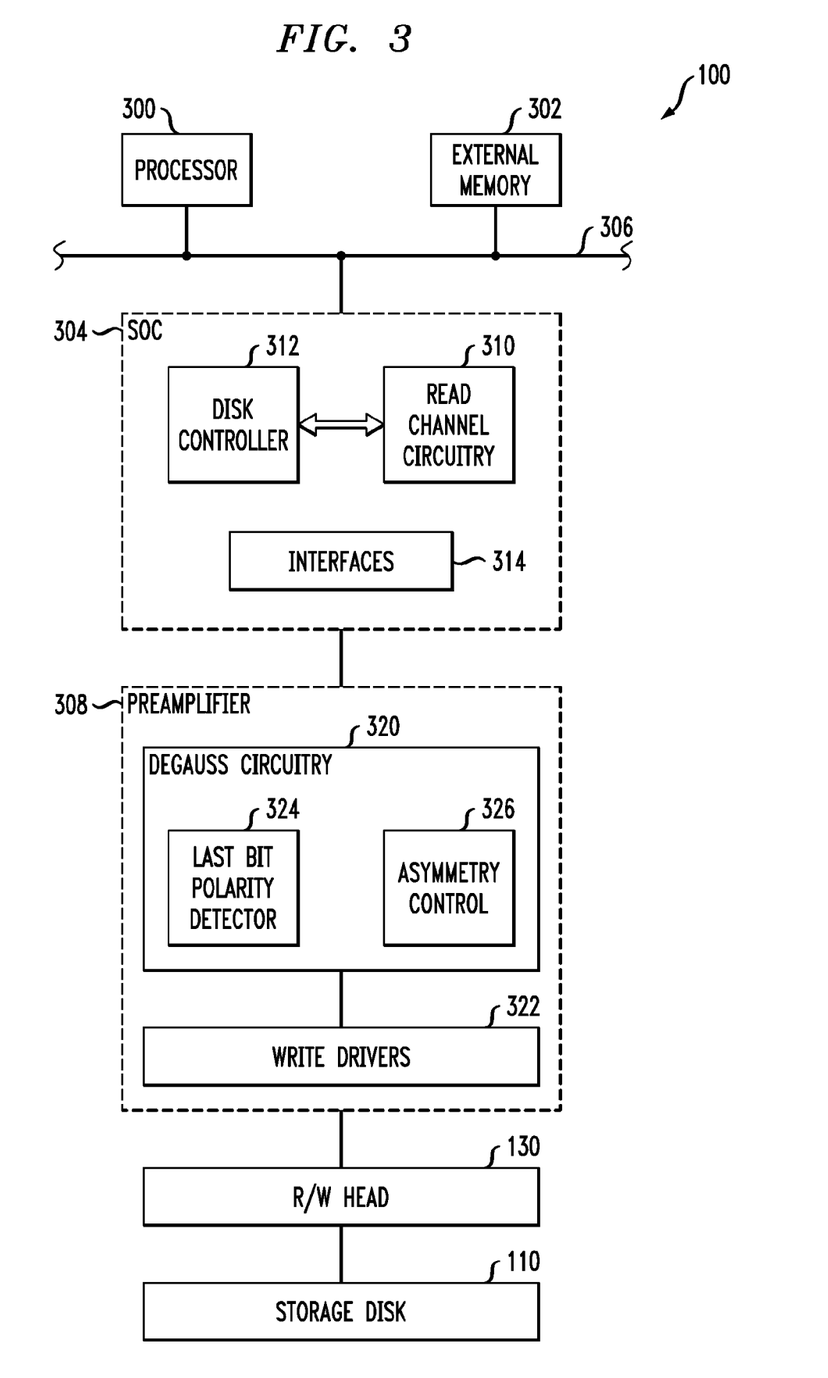
FIG. 3 is a block diagram of a portion of the storage device of FIG. 1 including a preamplifier comprising write drivers and associated degauss circuitry.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises a preamplifier 308 providing an interface between the SOC 304 and the read/write head 130. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the preamplifier 308. It should be understood that AXI interconnects are not required, and that a wide variety of other types of bus configurations may be used in embodiments of the invention.

The processor 300, memory 302, SOC 304 and preamplifier 308 may be viewed as collectively comprising one possible example of "control circuitry" as that term is utilized herein. Numerous alternative arrangements of control circuitry may be used in other embodiments, and such arrangements may include only a subset of the components 300, 302, 304 and 308, or portions of one or more of these components. For example, the SOC 304 itself may be viewed as an example of "control circuitry." The control circuitry of the storage device 100 in the embodiment as shown in FIG. 3 is generally configured to process data received from and supplied to the read/write head 130 and to control positioning of the read/write head 130 relative to the storage disk 110.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of a degaussing process carried out by the SOC 304. Thus, at least a portion of the degauss signal generation functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM), although a wide variety of other types of memory may be used in other embodiments. The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, bus 306 and preamplifier 308. Alternatively, portions of the processor 300, memory 302, bus 306 and preamplifier 308 may be implemented at least in part in the form of one or more additional integrated circuits, such as otherwise conventional integrated circuits designed for use in an HDD and suitably modified to implement degauss circuitry for generating degauss signals having asymmetric waveforms as disclosed herein.

An example of an SOC integrated circuit that may be modified for use in embodiments of the invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include degauss circuitry as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Referring now more particularly to the preamplifier 308 of the storage device 100, the preamplifier in this embodiment comprises degauss circuitry 320 and associated write drivers 322. The degauss circuitry 320 is configured to generate an asymmetric degauss signal to be applied to the write head, with the asymmetric degauss signal having a waveform with upper and lower decay envelopes that are asymmetric about a specified degauss current level, such as a substantially zero current level, or a positive or negative current level. The upper and lower decay envelopes of the asymmetric degauss signal waveform may comprise, for example, respective positive side and negative side decay envelopes.

The degauss circuitry 320 in this embodiment more particularly comprises a last bit polarity detector 324 and an asymmetry control module 326. The last bit polarity detector 324 is generally configured to detect the polarity of a last bit recorded to the storage medium 110 by the write head prior to application of the degauss signal. As will be described in greater detail below in conjunction with the degauss circuitry embodiments of FIGS. 4 and 6, the polarity of the last recorded bit is used by the asymmetry control module 326 to determine the particular type of asymmetry that is introduced in the degauss signal. In some embodiments, the last bit polarity detector 324 may be eliminated. For example, if a given write head has known asymmetric magnetic properties, the asymmetry introduced in the degauss signal may be selected so as to directly counteract the known asymmetric properties of the write head without determining the last bit polarity.

A given write driver 322 in the present embodiment may comprise multiple distinct data paths, such as a high side data path and a low side data path, although different numbers of data paths may be used in other embodiments. It should be noted in this regard that the term "data path" as used herein is intended to be broadly construed, so as to encompass, for example, CMOS circuitry or other types of circuitry through which a data signal passes in preamplifier 308 or another storage device component.

Also, the term "write driver" is intended to encompass any type of driver circuitry that may be used to deliver or otherwise provide one or more degauss signals to the write head of the storage device 100. By way of example, a given one of the write drivers 322 may comprise an X side and a Y side, each comprising both high side and low side drivers, where the X and Y sides are driven on opposite write cycles. Numerous alternative arrangements of circuitry are possible in other write driver embodiments.

Although illustratively shown in FIG. 3 as being separate from the write drivers 322, the degauss circuitry 320 may alternatively be implemented at least in part internally to the write drivers 322. In addition, a given asymmetric degauss signal may be applied to a write head using at least a portion of a corresponding write driver. Other techniques may be used to apply an asymmetric degauss signal to a write head in other embodiments.

Also, degauss circuitry 320 and associated write drivers need not be implemented entirely in preamplifier 308, and could in other embodiments be implemented at least in part in other control circuitry of the storage device 100.

Figure 6:
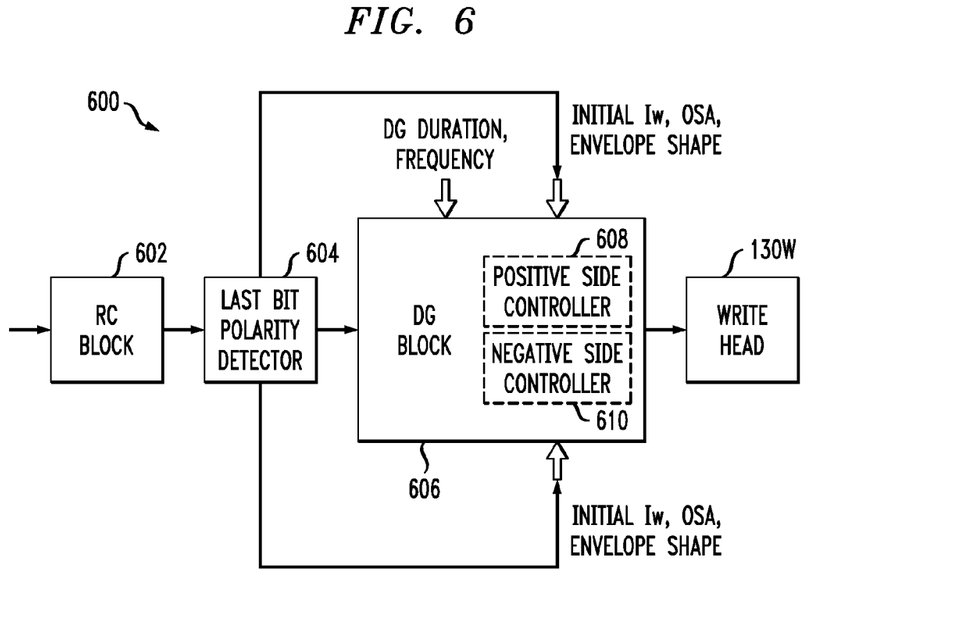
FIG. 6 shows a more detailed view of degauss circuitry in another embodiment.
Figure 7:
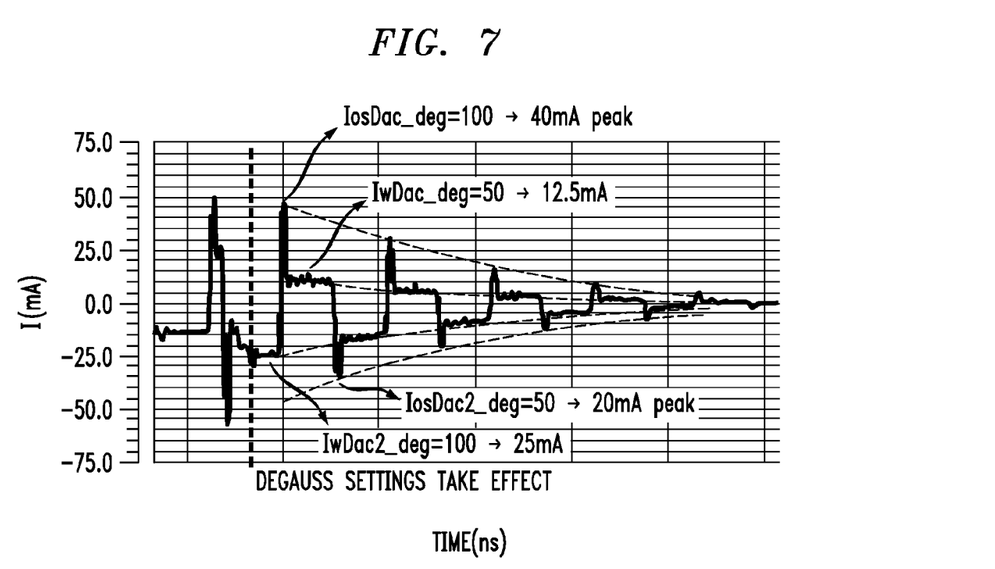
FIG. 7 illustrates an asymmetric degauss signal generated using the degauss circuitry of FIG. 6.

As noted above, examples of asymmetric degauss signal waveforms that may be generated by the degauss circuitry 322 are shown in FIGS. 5C, 5F and 7. In each of these examples, the asymmetric degauss signal waveform has upper and lower decay envelopes that are asymmetric about a specified degauss current level. The asymmetric degauss signals of FIGS. 5C and 5F are more particularly generated using the exemplary degauss circuitry shown in FIG. 4, and the asymmetric degauss signal of FIG. 7 is more particularly generated using the exemplary degauss circuitry shown in FIG. 6. The degauss circuitry arrangements of FIGS. 4 and 6 may therefore be viewed as representing more detailed examples of the degauss circuitry 320 of FIG. 3.

It was noted previously herein that a typical conventional degauss signal waveform includes current pulses that repeat at a fixed frequency and decay in amplitude over time. This conventional degauss signal waveform is therefore an alternating current waveform, with pulse amplitudes decaying at a specified rate, for substantially the full duration of the degauss signal. The waveform may include overshoot on each pulse. The upper and lower decay envelopes of the conventional degauss signal waveform are symmetric about a specified degauss current level, typically the zero current level.

Figure 4:
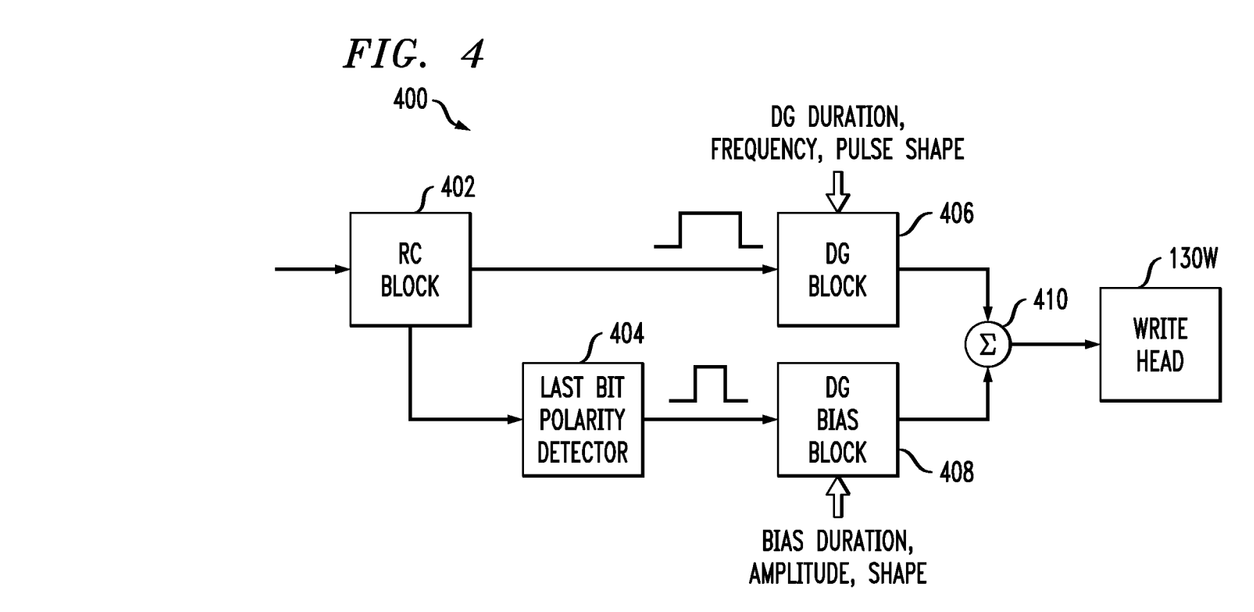
FIG. 4 shows a more detailed view of degauss circuitry in one embodiment.

In the degauss circuitry embodiments to be described in conjunction with FIGS. 4 and 6, different types of asymmetry control modules 324 are utilized in generating a given asymmetric degauss signal having upper and lower decay envelopes that are asymmetric about a specified degauss current level, which is assumed in these embodiments to be a substantially zero current level. In other embodiments, the specified current level about which the upper and lower decay envelopes are asymmetric may comprise a positive current level or a negative current level. Accordingly, the term "specified current level" as used herein is intended to be broadly construed as to encompass numerous types of predetermined, designated or otherwise specified current levels. Also, the term "asymmetry" as used herein in conjunction with upper and lower decay rates of a degauss signal waveform is intended to be broadly construed, and a wide variety of different types of variations between the upper and lower decay envelopes are contemplated as being encompassed by this term.

Referring now to FIG. 4, a portion 400 of storage device 100 comprises degauss circuitry coupled to write head 130W. In this embodiment, an asymmetric degauss signal is generated by combining a bias signal with a symmetric degauss signal. A read channel (RC) block 402 provides inputs to degauss circuitry comprising a last bit polarity detector 404, a degauss (DG) block 406, a DG bias block 408 and a signal combiner 410. The DG block 406 and DG bias block 408 are examples of what are more generally referred to herein as "signal generators" and in the present embodiment are configured to generate a symmetric degauss signal and a bias signal, respectively.

The last bit polarity detector 404 corresponds to the last bit polarity detector 324 of degauss circuitry 320 in FIG. 3, and the DG block 406, DG bias block 408 and signal combiner 410 collectively comprise one possible example of asymmetry control module 326 of FIG. 3. The RC block 402 may be viewed as corresponding to a portion of the read channel circuitry 310 of FIG. 3. Although not explicitly shown in FIG. 3, one or more interfaces may be provided between the read channel circuitry 310 and elements of the degauss circuitry 320 in the preamplifier 308.

Figures 5, 5A:
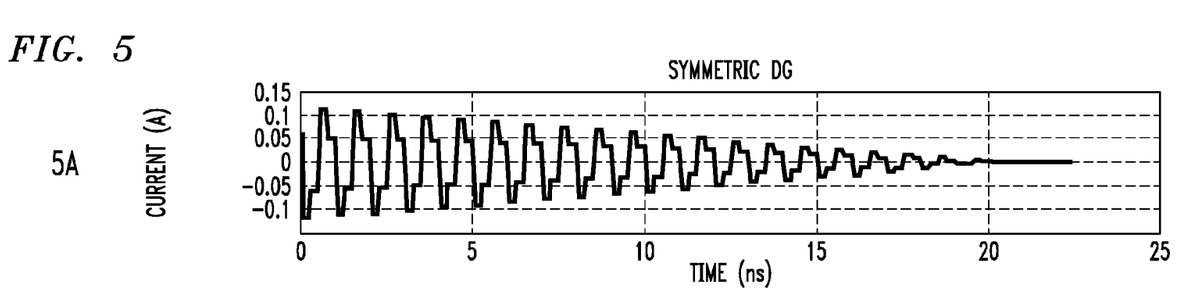
FIGS. 5A and 5D illustrate exemplary symmetric degauss signals.
Figure 5:
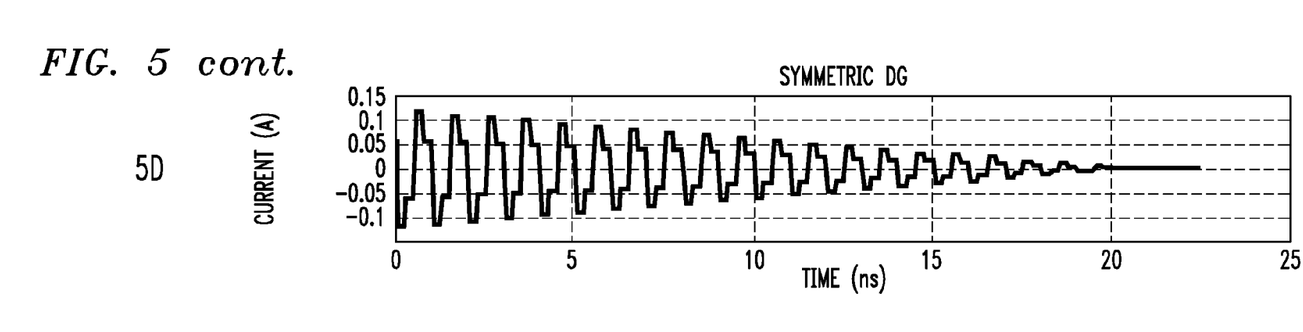
FIGS. 5B and 5E illustrate bias signals that are combined with the respective symmetric degauss signals of FIGS. 5A and 5D in the FIG. 4 degauss circuitry to generate the respective asymmetric degauss signals of FIGS. 5C and 5F.

The symmetric degauss signal generated by DG block 406 has a waveform with upper and lower decay envelopes that are symmetric about the specified degauss current level. Examples of symmetric degauss signals having upper and lower decay envelopes symmetric about a zero current level are shown in FIGS. 5A and 5D. The DG block 406 also receives one or more control signals for setting parameters of the symmetric degauss signal, such as degauss duration, frequency and pulse shape.

In each of the signal diagrams of FIG. 5, the signal in amperes (A) is plotted as a function of time in nanoseconds (ns). The symmetric degauss signal waveforms in FIGS. 5A and 5D each decay from an initial current amplitude level to a final current amplitude level in accordance with upper and lower decay envelopes that are symmetric about the zero current level. FIGS. 5A and 5D denote substantially the same symmetric degauss signal, repeated in order to better illustrate the application of different bias signals.

As indicated previously, the last bit polarity detector 404 is configured to detect a polarity of a last bit written to the storage medium 110 by the write head 130W prior to application of the degauss signal to the write head. At least one characteristic of the bias signal is determined at least in part as a function of the detected polarity.

For example, the bias signal may be configured such that the asymmetrical degauss signal waveform is biased in a direction opposite that of the polarity of the last bit written by the write head. Thus, if the last bit was a logic "1" bit written using a positive write current pulse, the bias signal may be configured to bias the asymmetric degauss signal in the negative current direction. Similarly, if the last bit was a logic "0" bit written using a negative write current pulse, the bias signal may be configured to bias the asymmetric degauss signal in the positive current direction. The biasing may be applied for a designated time interval up to the full duration of the degauss signal.

The DG bias block 408 receives one or more control signals for setting parameters of the bias signal such as bias duration, amplitude and shape. The detected last bit polarity and the one or more control signals collectively characterize the bias signal to be applied to the symmetric degauss signal by signal combiner 410. By way of example, the bias signal may comprise a stepped current signal of the type illustrated in FIG. 5B, or a ramped current signal of the type illustrated in FIG. 5E. In the stepped current signal of FIG. 5B, the current steps from a value of −10 milliamperes (mA) to a value of 0 mA at the 10 ns point in the degauss waveform. In the ramped current signal of FIG. 5E, the current ramps from a value of −30 mA to a value of 0 mA over a time period of 10 ns. A wide variety of other types of bias signals may be used in other embodiments, including current signals that decay as a function of time, or combinations of multiple current signals.

The signal combiner 410 has first and second inputs coupled to respective outputs of the DG block 406 and the DG bias block 408, and is configured to combine the symmetric degauss signal and the bias signal to form the asymmetric degauss signal. FIG. 5C illustrates the asymmetric degauss signal that results from combination of the symmetric degauss signal of FIG. 5A with the bias signal of FIG. 5B. Similarly, FIG. 5F illustrates the asymmetric degauss signal that results from combination of the symmetric degauss signal of FIG. 5D with the bias signal of FIG. 5E. In each of the asymmetric degauss signals of FIGS. 5C and 5F, application of the bias signal of FIG. 5B or FIG. 5E has altered the upper and lower decay envelopes of the original symmetric degauss signal such that those decay envelopes are no longer symmetric about the zero current level. The particular signals shown in FIG. 5 are exemplary only, and numerous other types of symmetric degauss signals and bias signals may be used in forming asymmetric degauss signals in other embodiments.

The symmetric and asymmetric degauss signals in the FIG. 5 examples each comprise a plurality of current pulses with corresponding upper and lower steady-state values that decay in amplitude over time in accordance with the specified decay envelope. The current pulses in these examples include overshoot, which similarly decay over time, although in other embodiments at least a subset of the current pulses may not include overshoot.

Referring now to FIG. 6, a portion 600 of storage device 100 comprises degauss circuitry coupled to write head 130W. In this embodiment, an asymmetric degauss signal is generated using separate control of upper and lower decay envelopes of the degauss signal. An RC block 602 provides an input to degauss circuitry comprising a last bit polarity detector 604 and a DG block 606. The DG block 606 includes separate positive side and negative side controllers 608 and 610 as illustrated. The positive side and negative side controllers 608 and 610 are examples of what are more generally referred to herein as respective first and second controllers. In the present embodiment, the positive side controller 608 is configured to control a positive side decay envelope of the asymmetric degauss signal waveform responsive to a first set of one or more control signals, and the negative side controller 610 is configured to control a negative side decay envelope of the asymmetric degauss signal waveform responsive to a second set of one or more control signals.

The positive side and negative side decay envelopes in this embodiment are examples of what are more generally referred to herein as respective upper and lower decay envelopes. The terms "positive" and "negative" refer to respective positive and negative current ranges, as the positive decay envelope is in a positive current range and the negative decay envelope is in a negative current range, in this particular embodiment in which the asymmetry between the decay envelopes is about a zero current level.

In other embodiments, the upper and lower decay envelopes need not be respective positive side and negative side decay envelopes. For example, in an embodiment in which the degauss signal varies about a positive current level, it is possible that the upper and lower decay envelopes may both be positive side decay envelopes. Similarly, in an embodiment in which the degauss signal varies about a negative current level, it is possible that the upper and lower decay envelopes may both be negative side decay envelopes. Also, it is possible that a given upper or lower decay envelope may be partially positive side and partially negative side.

The last bit polarity detector 604 corresponds to the last bit polarity detector 324 of degauss circuitry 320 in FIG. 3, and the DG block 606 is one possible example of asymmetry control module 326 of FIG. 3. Like the RC block 402, the RC block 602 may be viewed as corresponding to a portion of the read channel circuitry 310 of FIG. 3.

The asymmetric degauss signal generated by DG block 606 has a waveform with positive side and negative side decay envelopes that are asymmetric about the specified degauss current level, in this case a zero current level. An example of an asymmetric degauss signal of this type is shown in FIG. 7.

The DG block 606 receives one or more control signals for setting parameters of the asymmetric degauss signal, such as degauss duration, frequency and pulse shape. Each of the positive side and negative side controllers 608 and 610 is configured to independently establish one or more of an initial steady-state current value Iw, an initial overshoot amplitude OSA and an envelope shape for the corresponding one of the positive side and negative side decay envelopes of the asymmetric degauss signal. By way of example, the envelope shape for at least one of the positive side and negative side decay envelopes may comprise a linear decay envelope or an exponential decay envelope. The DG block may utilize one or more digital-to-analog converters (DACs) as well as other circuitry.

As in the FIG. 4 embodiment, the last bit polarity detector 604 is configured in the FIG. 6 embodiment to detect a polarity of a last bit written to the storage medium 110 by the write head 130W prior to application of the degauss signal to the write head. The detector 604 has an output coupled to an input of each of the positive side and negative side controllers 608 and 610. At least one characteristic of a given positive side or negative side decay envelope of the asymmetric degauss signal, such as initial steady-state current Iw, the overshoot amplitude OSA, the envelope shape or other characteristic, is determined at least in part as a function of the detected polarity. Although not explicitly indicated in the figure, the control signals for the DG block 606 other than the last bit polarity may be supplied by the RC block 602 or another part of the read channel circuitry 310, or may be supplied by one or more other control circuitry components of the storage device 100.

In the signal diagram of FIG. 7, the asymmetric degauss signal in milliamperes (mA) is plotted as a function of time in nanoseconds (ns). The asymmetric degauss signal waveform in FIG. 7 utilizes different Iw and OSA settings for the positive and negative sides of the waveform, which collectively establish asymmetric decay envelopes for the respective positive and negative sides of the waveform. The overshoot is specified in this example as an increase in current relative to the steady-state current Iw, and more particularly as a peak overshoot current denoted Ios. It is assumed that separate sets of DAC degauss settings are used in the DG block 606 to establish the initial Iw and Ios values for the positive and negative sides of the waveform. Such DAC degauss settings may be viewed as examples of "control signals" as that term is broadly used herein. The DAC degauss settings for Iw and Ios are more particularly denoted in the figure as IwDac_deg and IosDac_deg for the positive side of the waveform, and IwDac2_deg and IosDac2_deg for the negative side of the waveform.

For the positive side of the waveform, initial steady-state and overshoot current values of 12.5 mA and 40 mA are used, corresponding to respective DAC degauss settings of IwDac_deg=50 and IosDac_deg=100, and for the negative side of the waveform, initial steady-state and overshoot current values of 25 mA and 20 mA are used, corresponding to respective DAC degauss settings of IwDac2_deg=100 and IosDac2_deg=50. Accordingly, the positive side of the asymmetric degauss signal starts with twice the overshoot amplitude OSA and half the steady-state current Iw as the negative side of the asymmetric degauss signal. These degauss settings take effect at the point in the signal denoted by a vertical line, as indicated. Although the decay envelopes all have a generally exponential shape, the use of different initial steady-state and overshoot current values establishes an asymmetry between corresponding positive side and negative side decay envelopes.

More particularly, in this example, separate upper and lower decay envelopes are defined for both the steady-state and overshoot portions of the waveform, such that a total of four decay envelopes are shown, illustrated by dashed lines in the figure. It can be seen that the upper and lower decay envelopes for the steady-state portions of the waveform are asymmetric about the zero current level, and further that the upper and lower decay envelopes for the overshoot portions of the waveform are also asymmetric about the zero current level. The term "decay envelope" as used herein with reference to an asymmetric degauss signal is intended to be broadly construed, and a given decay envelope may therefore be defined relative to steady-state portions of the degauss pulses or relative to overshoot portions of the degauss pulses, or in other ways.

Again, the particular asymmetric degauss signal shown in FIG. 7 is exemplary only, and numerous other types of asymmetric degauss signals may be generated using separate upper and lower decay envelope controllers in other embodiments.

Also, other embodiments may configure the DG block 606 to include only a positive side controller or only a negative side controller. Thus, in embodiments of the invention, asymmetry may be introduced in a degauss signal waveform by adjustment of only one of the upper and lower decay envelopes.

In both the FIG. 4 and FIG. 6 embodiments, the degauss circuitry may be configured to provide additional control mechanisms for various parameters of the asymmetric degauss signals. For example, in some embodiments, decay envelopes may be controlled such that the steady-state and overshoot portions of a given positive side or negative side of the degauss signal will decay at different rates.

Such an arrangement may involve configuring one or both of positive side controller 608 and negative side controller 610 to include separate control mechanisms for controlling respective steady-state and overshoot portions of the corresponding side of the waveform, such that different decay rates can be provided for each of these portions, as described in U.S. patent application Ser. No. 13/447,741, filed Apr. 16, 2012 in the name of B. Livshitz et al. and entitled "Storage Device Having Degauss Circuitry with Separate Control of Degauss Signal Steady State and Overshoot Portions," which is commonly assigned herewith and incorporated by reference herein. Alternatively, the steady-state and overshoot portions of a given positive or negative side of the degauss signal may both decay at substantially the same rate, although asymmetry may be provided, for example, by using different decay rates for the positive and negative sides.

It is also possible that the frequency of a given asymmetric degauss signal waveform can be varied as a function of time. Degauss signal waveforms of this type may be viewed as examples of "chirped" degauss signal waveforms. See U.S. Patent Application Publication No. 2013/0021691A1, filed Jul. 19, 2011 in the name of J. S. Goldberg et al. and entitled "Magnetic Storage Device with Chirped Write Head Degaussing Waveform," which is commonly assigned herewith and incorporated by reference herein.

Also, a given degauss signal waveform may comprise a plurality of decay segments including at least one alternating current decay segment and at least one direct current decay segment. For example, an initial decay segment of a plurality of decay segments may comprise an alternating current decay segment or a direct current decay segment, and may be immediately followed by a decay segment of the opposite type. The decay segments may thus begin with one of an alternating current decay segment and a direct current decay segment and then alternate sequentially between these two decay segment types. Additional details can be found in U.S. patent application Ser. No. 13/606,279, filed Sep. 7, 2012 in the name of B. Livshitz et al. and entitled "Storage Device having Degauss Circuitry Generating Degauss Signal with Multiple Decay Segments," which is commonly assigned herewith and incorporated by reference herein. A given alternating current decay segment can use a fixed frequency or a frequency that varies over time, as in the case of a chirped degauss signal waveform. Each of the segments can be configured to have corresponding upper and lower decay rates that are asymmetric about a specified current level as disclosed herein.

Accordingly, the particular asymmetric degauss signals presented in FIGS. 5C, 5F and 7 are for purposes of illustration only and should not be construed as limiting in any way. Numerous other asymmetric degauss signal waveforms may be used, in which upper and lower decay envelopes are asymmetric about a specified degauss current level. For example, as noted above, a given embodiment may include several different decay segments, each having upper and lower decay envelopes, with some of the segments having upper and lower decay envelopes that are asymmetric and others having upper and lower decay envelopes that are symmetric. The upper and lower decay envelopes of such multiple decay segments may have different decay rates or other characteristics.

A degaussing process may be implemented in the FIG. 1 storage device in an illustrative embodiment as follows. After completing a write of a given sector of data, the write current will need to be turned off in many cases. However, if the write head is known or suspected to produce EAW, then the write current may be set to asymmetric degauss mode immediately following a write mode, before it is turned off, in order to prevent write head remanent magnetization from affecting other areas of the magnetic storage surface, including data sectors and servo sectors. Numerous other degauss processes using additional or alternative steps may be used in other embodiments.

The illustrative embodiments provide a number of significant advantages relative to conventional degaussing arrangements. For example, by providing a degauss signal waveform having asymmetric upper and lower decay envelopes, improved write head demagnetization is achieved after each of a plurality of write operations in which data is written to the storage disk, thereby avoiding the above-noted EAW problem and leading to improved recording performance for respective subsequent write operations. As a more particular example, an asymmetric degauss signal of the type described herein can be particularly effective at reducing out-of-plane magnetization in the write head. In addition, an asymmetric degauss signal can allow degaussing time to be substantially reduced. Moreover, an asymmetric degauss signal can have significantly reduced steady-state and overshoot amplitudes relative to a conventional symmetric degauss signal, thereby potentially reducing the power consumption of the storage device during a degauss mode of operation.

Accordingly, embodiments of the present invention can produce better write head demagnetization, shorter degaussing time, and reduced power consumption in a storage device. This is particularly true for write heads that may not be optimally demagnetized using conventional degauss signals.

It is to be appreciated that the particular circuitry arrangements, degauss signal waveforms and degauss process operations described above in conjunction with FIGS. 3-7 are presented by way of example only, and other embodiments of the invention may utilize other types and arrangements of elements for generating asymmetric degauss signal waveforms as disclosed herein.

Also, numerous alternative degauss waveform parameters may be varied in other embodiments, including degauss signal duration, initial and final current amplitudes, decay envelope shape, presence or absence of overshoot, manner of control of steady-state and overshoot portions, types and arrangements of segments, and so on.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, a variety of recording techniques including shingled magnetic recording (SMR), bit-patterned media (BPM), heat-assisted magnetic recording (HAMR) and microwave-assisted magnetic recording (MAMR) can be used in one or more embodiments of the invention. Accordingly, embodiments of the invention are not limited with regard to the particular types of storage media that are used in a given storage device.

Figure 8:
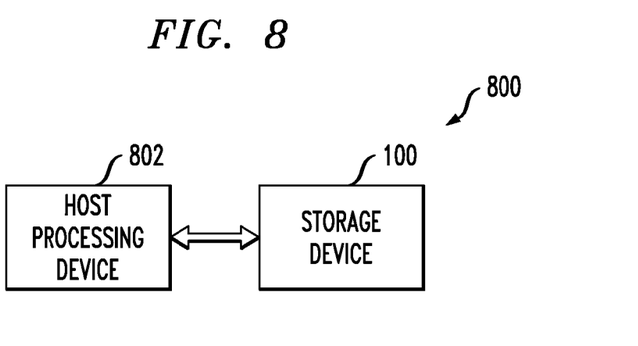
FIG. 8 illustrates interconnection of the storage device of FIG. 1 with a host processing device in a data processing system.

FIG. 8 illustrates a processing system 800 comprising the disk-based storage device 100 coupled to a host processing device 802, which may be a computer, server, communication device, etc. Although shown as a separate element in this figure, the storage device 100 may be incorporated into the host processing device. Instructions such as read commands and write commands directed to the storage device 100 may originate from the processing device 802, which may comprise processor and memory elements similar to those previously described in conjunction with FIG. 3.

Figure 9:
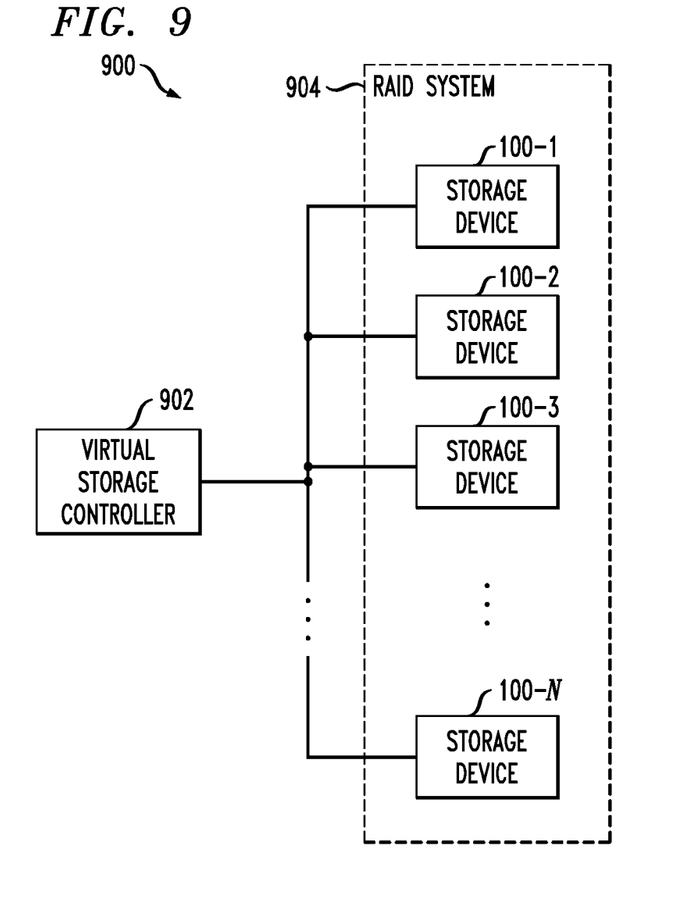
FIG. 9 shows a virtual storage system incorporating a plurality of disk-based storage devices of the type shown in FIG. 1.

Multiple storage devices 100-1 through 100-N possibly of various different types may be incorporated into a virtual storage system 900 as illustrated in FIG. 9. The virtual storage system 900, also referred to as a storage virtualization system, illustratively comprises a virtual storage controller 902 coupled to a RAID system 904, where RAID denotes Redundant Array of Independent storage Devices. The RAID system 904 more specifically comprises N distinct storage devices denoted 100-1, 100-2, . . . 100-N, one or more of which may be HDDs and one or more of which may be solid state drives. Furthermore, one or more of the HDDs of the RAID system 904 are assumed to include degauss circuitry configured to generate a degauss signal having asymmetric upper and lower decay envelopes as disclosed herein. These and other virtual storage systems comprising HDDs or other storage devices of the type disclosed herein are considered embodiments of the invention. The host processing device 802 in FIG. 8 may also be an element of a virtual storage system such as system 900, and may incorporate the virtual storage controller 902.

Again, it should be emphasized that the above-described embodiments of the invention are intended to be illustrative only. For example, other embodiments can use different types and arrangements of storage media, write heads, control circuitry, preamplifiers, write drivers, degauss circuitry and other storage device elements for implementing the described degauss signal generation. Also, the particular manner in which asymmetry is provided for upper and lower decay envelopes of a degauss signal, and the various parameters used for each of the upper and lower decay envelopes, may be varied in other embodiments. These and numerous other alternative embodiments within the scope of the following claims will be apparent to those skilled in the art.

What is claimed is:

1. An apparatus comprising:
control circuitry adapted for coupling to a write head configured to write data to a storage medium;
wherein the control circuitry comprises:
a write driver; and
degauss circuitry associated with the write driver and configured to generate an asymmetric degauss signal to be applied to the write head, the asymmetric degauss signal having a waveform with upper and lower decay envelopes having respective different decay rates;
wherein the degauss circuitry comprises:
a detector configured to detect a polarity of a last bit written to the storage medium by the write head prior to application of the asymmetric degauss signal to the write head;
wherein at least one characteristic of at least one of a bias signal, the upper decay envelope and the lower decay envelope is determined at least in part as a function of the detected polarity.

2. The apparatus of claim 1 wherein the upper and lower decay envelopes of the asymmetric degauss signal waveform comprise respective positive side and negative side decay envelopes.

3. The apparatus of claim 1 wherein the upper and lower decay envelopes are asymmetric about a substantially zero current level.

4. The apparatus of claim 1 wherein the degauss circuitry further comprises:
a first signal generator configured to generate a symmetric degauss signal having a waveform with upper and lower decay envelopes that are symmetric about a specified degauss current level;
a second signal generator configured to generate the bias signal; and
a signal combiner having first and second inputs coupled to respective outputs of the first and second signal generators and configured to combine the symmetric degauss signal and the bias signal to form the asymmetric degauss signal.

5. The apparatus of claim 4 wherein the bias signal comprises a stepped current signal.

6. The apparatus of claim 4 wherein the bias signal comprises at least one of a ramped current signal and a current signal that decays as a function of time.

7. The apparatus of claim 1 wherein the control circuitry is fabricated in at least one integrated circuit.

8. A storage device comprising the apparatus of claim 1.

9. A virtual storage system comprising the storage device of claim 8.

10. The apparatus of claim 1 wherein the control circuitry further comprises:
at least one integrated circuit comprising a disk controller; and
a preamplifier coupled between said at least one integrated circuit and the write head;
wherein the write driver and its associated degauss circuitry are implemented in the preamplifier.

11. An apparatus comprising:
control circuitry adapted for coupling to a write head configured to write data to a storage medium;
wherein the control circuitry comprises:
a write driver; and
degauss circuitry associated with the write driver and configured to generate an asymmetric degauss signal to be applied to the write head, the asymmetric degauss signal having a waveform with upper and lower decay envelopes having respective different decay rates;
wherein the degauss circuitry comprises:
a first controller configured for controlling said upper decay envelope of the asymmetric degauss signal waveform responsive to a first control signal; and
a second controller configured for controlling said lower decay envelope of the asymmetric degauss signal waveform responsive to a second control signal.

12. The apparatus of claim 11 wherein the degauss circuitry further comprises:
a detector configured to detect a polarity of a last bit written to the storage medium by the write head;
the detector having an output coupled to an input of at least one of the first and second controllers;
wherein at least one characteristic of at least one of the upper and lower decay envelopes is determined at least in part as a function of the detected polarity.

13. The apparatus of claim 11 wherein each of the first and second controllers is configured to independently establish one or more of an initial steady-state current value, an initial overshoot current value and an envelope shape for the corresponding one of the upper and lower decay envelopes of the asymmetric degauss signal.

14. The apparatus of claim 13 wherein the envelope shape for at least one of the upper and lower decay envelopes comprises one of a linear decay envelope and an exponential decay envelope.

15. A method comprising the steps of:
writing data to a storage medium via a write head of a storage device;
generating an asymmetric degauss signal having a waveform with upper and lower decay envelopes having respective different decay rates;
detecting a polarity of a last bit written to the storage medium by the write head prior to application of the asymmetric degauss signal to the write head;
determining at least one characteristic of at least one of a bias signal, the upper decay envelope and the lower decay envelope at least in part as a function of the detected polarity; and
applying the asymmetric degauss signal to the write head of the storage device.

16. The method of claim 15 wherein the generating step comprises:
generating a symmetric degauss signal having a waveform with upper and lower decay envelopes that are symmetric about a specified degauss current level;
generating the bias signal; and
combining the symmetric degauss signal and the bias signal to form the asymmetric degauss signal.

17. The method of claim 15 wherein the generating step comprises:
controlling said upper decay envelope of the asymmetric degauss signal waveform responsive to a first control signal; and
controlling said lower decay envelope of the asymmetric degauss signal waveform responsive to a second control signal.

18. A non-transitory computer-readable storage medium having embodied therein executable code for performing the steps of the method of claim 15.

19. A processing system comprising:
a processing device; and
a storage device coupled to the processing device and comprising at least one storage medium;
wherein the storage device further comprises:
a write head configured to write data to the storage medium; and
control circuitry coupled to the write head;
the control circuitry comprising:
a write driver; and
degauss circuitry associated with the write driver and configured to generate an asymmetric degauss signal to be applied to the write head, the asymmetric degauss signal having a waveform with upper and lower decay envelopes having respective different decay rates;
wherein the degauss circuitry comprises:
a detector configured to detect a polarity of a last bit written to the storage medium by the write head prior to application of the asymmetric degauss signal to the write head;
wherein at least one characteristic of at least one of a bias signal, the upper decay envelope and the lower decay envelope is determined at least in part as a function of the detected polarity.

20. The processing system of claim 19 wherein the degauss circuitry further comprises:
a first controller configured for controlling said upper decay envelope of the asymmetric degauss signal waveform responsive to a first control signal; and
a second controller configured for controlling said lower decay envelope of the asymmetric degauss signal waveform responsive to a second control signal.

* * * * *